Feb. 21, 1928.

T. E. MURRAY, JR 1,659,920

ELECTRIC WELDING PROCESS

Filed Dec. 18, 1924

Inventor
Thomas E. Murray, Jr.
By His Attorney

Patented Feb. 21, 1928.

1,659,920

UNITED STATES PATENT OFFICE.

THOMAS E. MURRAY, JR., OF BROOKLYN, NEW YORK.

ELECTRIC WELDING PROCESS.

Application filed December 18, 1924. Serial No. 756,630.

The present application is directed specifically to a process in which a steel tube is provided with a fin or flange of copper or other material of comparatively high conductivity, and generally to a new method of welding which is applicable to many other products as hereinafter explained.

The accompanying drawings illustrate embodiments of the invention.

Figure 1:
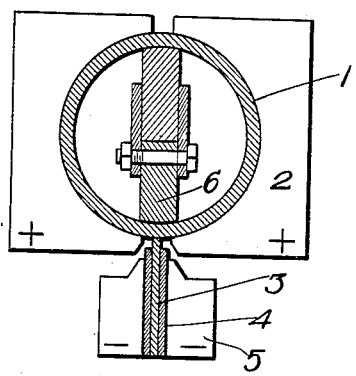
Fig. 1 is a cross-section illustrating the position of a tube and a flange before the welding operation.

Referring to the embodiments of the invention illustrated, a steel tube 1 such as is usually employed for boiler tubing, either seamless or with a welded seam, is arranged between a pair of electrodes 2. A fin to be attached thereto is made up of a central portion 3 of steel or iron faced on both sides by plates 4 of copper or copper-containing composition, the whole being clamped between electrodes 5. The edge of the composite fin is pressed against the tube while a welding current is passed across the joint. Preferably the Murray method is used in which a current of extremely high amperage or density in proportion to the cross-section is used for a very brief interval of time. The welding is carried out best with a light pressure at first to form an arc and a heavy pressure at the end of the operation to form the actual weld in the normal way.

The steel plate 3 projects beyond the copper plates to an extent slightly less than the comtemplated take-up. The arc is, therefore, drawn on the steel plate, which has a higher fusing point than copper and is, therefore, better able to stand up under the heat. The copper is heated to a less extent in the beginning of the operation and is brought to its welding temperature chiefly by the heat from the steel arc, and for a brief time at the end of the operation by an arc to the copper itself just before the final heavy pressure.

It is advantageous to extend the steel beyond the copper so as to make the arc and the contact in the beginning to the steel alone, so as to avoid the melting or burning out of the copper at the contact edge and so that most of the metal lost by extrusion in the take-up is of the cheaper steel.

The heating of the tube by the arc softens it at this point. If it is thicker even this softening will have no disadvantageous effect, but for thin tubes there is apt to be an inward bending and for these I propose to use a mandrel or other support within. Such a mandrel is indicated at 6.

Figure 2:
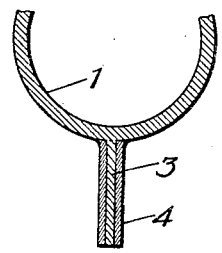
Fig. 2 is a section of the parts shown in Fig. 1, after welding.

The product of the operation described is shown in Fig. 2. The extended portion of the steel plate 3 has been extruded so as to bring the copper plates 4 into engagement with the tube and to weld the latter as well as the steel plate 3 to the tube. The extruded metal may be left in place for many uses, though in the case illustrated it is cut away as usual.

Figure 3:
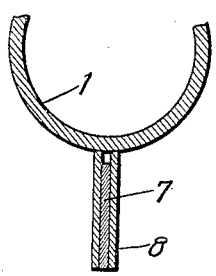
Figs. 3 and 4 are similar views of a modification before and after the completion of the welding operation.
Figure 4:
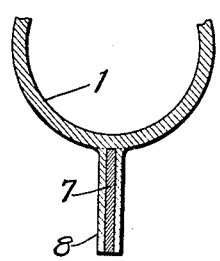

The particular number and location of the steel and the copper parts in the fin, and, generally speaking, their shapes may be considerably varied depending on the contemplated use of the product and the requirements thereof. For example, the fin may be composed of a central plate of copper and outside plates of steel. Figs. 3 and 4 illustrate this. Fig. 3 shows the fin composed of a central plate 7 of copper faced by outer plates 8 of steel projecting slightly beyond the edge of the copper. Fig. 4 shows such a fin welded on the tube, the excess of steel being taken up and the steel and copper plates being all advanced far enough to be welded to the tube.

Figure 5:
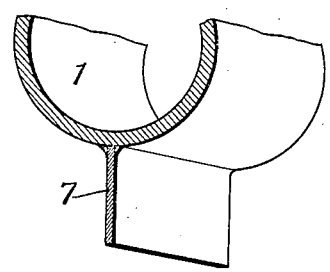
Fig. 5 is a perspective view of a product produced from that of Fig. 4.

The product may be used in the forms shown in Figs. 2 and 4. Or the steel plates, after being used for the purpose of securing a good weld of the copper to the tube, may be removed leaving only the plate 7 of copper as in Fig. 5, the copper being welded to the steel tube.

Steel tubes of this sort with one or more fins composed at least in part of copper or metal of higher conductivity are particularly advantageous in boiler walls, providing for a greatly increased conduction of heat in proportion to the volume of water in the tube compared with the ordinary constructions. Copper for the fins has an additional advantage in its resistance to oxidation. It may be used in such size as to secure a greatly increased conducting effect compared with steel; or a copper fin may be used which is very much smaller than the steel fin which would be required for a given conductive effect. That is to say, we may secure by the use of copper an increased conducting effect or a reduction in size, or both, as compared with the plain steel fin. It will be understood that while the copper is preferably used in the form of a fin or flange, this expression is intended to include projections of various other shapes serving similar functions.

The copper and steel parts of the fin may be of varying comparative thickness and may be united to each other in various ways, as by spot welding or riveting for example, or may be merely clamped together during their attachment to the tube. The tube and the parts of the fin referred to as steel, or either of these, may be of iron or other analogous metal of lower conductivity than the parts referred to as copper.

Figure 6:
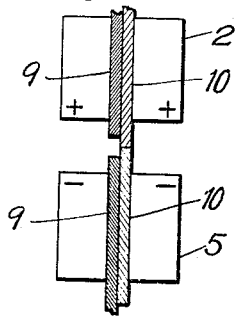
Figs. 6, 7 and 8 are views similar to Fig. 1, illustrating other uses of the invention.
Figure 7:
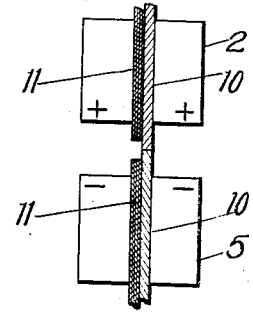
Figure 8:
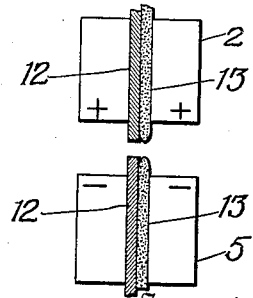

The invention is applicable generally to various other metals and various other welding operations where difficulties arise because of differences of conductivity in the two parts to be welded; and there are circumstances under which the invention can be advantageously used in welding together two pieces of the same metal. And while it is particularly advantageous in securing the edge of one piece to the surface of another, it is advantageous also in ordinary straight butt-welding operations. Figs. 6, 7 and 8 show such operations.

Fig. 6 shows a pair of solid copper plates 9 which are to be welded together at their edges. Steel plates 10 are clamped alongside of them between electrodes 2 for one pair and electrodes 5 for the other pair. The current is passed and the electrodes 2 pressed toward the electrodes 5. The steel plates project beyond the edges of the copper plates so that they come together first and are welded and taken up by the movement of the electrodes toward each other, and finally the copper plates come together and are welded. The steel, having a higher fusing point than the copper, stands up better under the extreme heat at the beginning of the operation, during which time the copper is heated to a less extent and the copper is brought to its welding temperature chiefly by the heat from the steel arc, and for a brief time at the end of the operation by an arc to the copper itself which does not last long enough to injure the copper before the final pressure is exerted or before the current is cut off.

Fig. 7 illustrates the same operation applied to the welding of plates 11 of copper made up of a number of laminations assembled together. The steel plates 10 and the electrodes 2 and 5 are the same as in Fig. 6. In the product of Figs. 6 and 7, the steel may be afterwards removed from the copper as in the manner explained in connection with Fig. 5.

Fig. 8 illustrates the application of the invention to the uniting of two copper rods or plates 12 with the aid of rods or plates 13 of carbon. The parts are clamped together between the halves of their respective electrodes. A current is passed and the electrodes moved toward each other sufficiently to form an arc between the two carbon rods. This arc is so closely adjacent to the pieces of copper 12 as to soften them without overheating. The spacing is such as to permit the copper parts to be brought together with a welding pressure; the copper being subjected to its highest temperature by the arc between the two copper pieces just before the welding pressure is applied.

Though I have described with great particularity of detail certain embodiments of my invention, yet it is not to be understood therefrom that the invention is restricted to the particular embodiments disclosed. Various modifications thereof may be made by those skilled in the art without departing from the invention as defined in the following claims.

What I claim is:

1. The method of electrically welding the end or edge of a copper part to a second part of steel which consists in holding the copper adjacent to a third part of steel and welding the combination to the second part, performing the welding preliminarily between the two parts of steel and finally with the part of copper.

2. The method of electrically welding the end or edge of a part of copper to an extended surface of a second part of steel which consists in holding the copper adjacent to a third part of steel, pressing the edge of such combination against said extended surface, passing an electric welding current between them and welding first the two steel parts and finally the copper part.

3. The method of welding a copper fin to a steel tube which consists in holding a copper plate adjacent to a steel plate, the latter projecting slightly beyond the former, and welding first the steel plate then the steel and copper plates together to the tube.

4. The method of welding a copper fin to a steel tube which consists in holding a copper plate adjacent to a steel plate, the latter projecting slightly beyond the former, and welding first the steel plate then the steel and copper plates together to the tube and thereafter removing the steel plate.

5. The method of welding a part of comparatively low fusibility to a second part of comparatively high fusibility which consists in holding the first part assembled with a third part of comparatively high fusibility, pressing the two assembled parts (with that of higher fusibility slightly in advance) against the second part and passing a welding current across the contacting surfaces and continuing the pressure and current until the first part is welded to the second.

6. The method of effecting a weld with a part of comparatively low fusibility which consists in assembling it with a second part of comparatively high fusibility, pressing the two assembled parts against a third part, forming an arc between the second part and a third part to which the first is to be welded and continuously pressing the two assembled parts against the third part while passing a welding current across the contacting surfaces to make the desired weld.

7. The method of welding two parts together which consists in initially heating them by an adjacent arc and pressing their edges together and passing a current across the joint to weld them, said arc being formed by an arc-forming piece of different composition assembled with at least one of said parts and advanced with it.

In witness whereof, I have hereunto signed my name.

THOMAS E. MURRAY, Jr.